United States Patent
Nakano et al.

(10) Patent No.: US 9,342,766 B2
(45) Date of Patent: May 17, 2016

(54) IMAGE GENERATION PROGRAM AND PRINTER FOR PRINTING COMPOSITE IMAGE ON A MEDIUM ARRANGED SO AS TO FACE A LENS LAYER HAVING A PLURALITY OF LENSES

(71) Applicant: SEIKO EPSON CORPORATION, Tokyo (JP)

(72) Inventors: Tomoyuki Nakano, Nagano (JP); Hiroshi Shirotori, Nagano (JP); Hitoshi Toyoshima, Nagano (JP); Katsuhito Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/449,860

(22) Filed: Aug. 1, 2014

(65) Prior Publication Data
US 2015/0036153 A1    Feb. 5, 2015

(30) Foreign Application Priority Data

Aug. 2, 2013 (JP) .................... 2013-161697

(51) Int. Cl.
*G02B 27/22* (2006.01)
*G06K 15/02* (2006.01)
*G03B 35/14* (2006.01)

(52) U.S. Cl.
CPC ........ *G06K 15/1842* (2013.01); *G02B 27/2214* (2013.01); *G03B 35/14* (2013.01); *G06K 15/021* (2013.01)

(58) Field of Classification Search
None
See application file for complete search history.

(56) References Cited

U.S. PATENT DOCUMENTS

| | | | | |
|---|---|---|---|---|
| 6,026,215 | A * | 2/2000 | Fantone et al. | 358/1.2 |
| 6,380,970 | B1 * | 4/2002 | Minamikawa | 348/46 |
| 8,159,529 | B2 * | 4/2012 | Yoshida et al. | 348/51 |

FOREIGN PATENT DOCUMENTS

| | | |
|---|---|---|
| JP | 07-281327 A | 10/1995 |
| JP | 09-325440 A | 12/1997 |
| JP | 2001-042462 A | 2/2001 |
| JP | 2012-160058 A | 8/2012 |

* cited by examiner

*Primary Examiner* — Paul F Payer
(74) *Attorney, Agent, or Firm* — Global IP Counselors, LLP

(57) ABSTRACT

An image generation method for generating an image, which is printed on a medium arranged so as to face a lens layer having a plurality of lenses and includes a three-dimensional image and a two-dimensional image, includes performing lossy compression for the two-dimensional image in a direction in which light focusing of the lenses occurs and magnifying the two-dimensional image in the direction in which the light focusing of the lenses occurs after the lossy compression for the two-dimensional image has been performed.

8 Claims, 6 Drawing Sheets

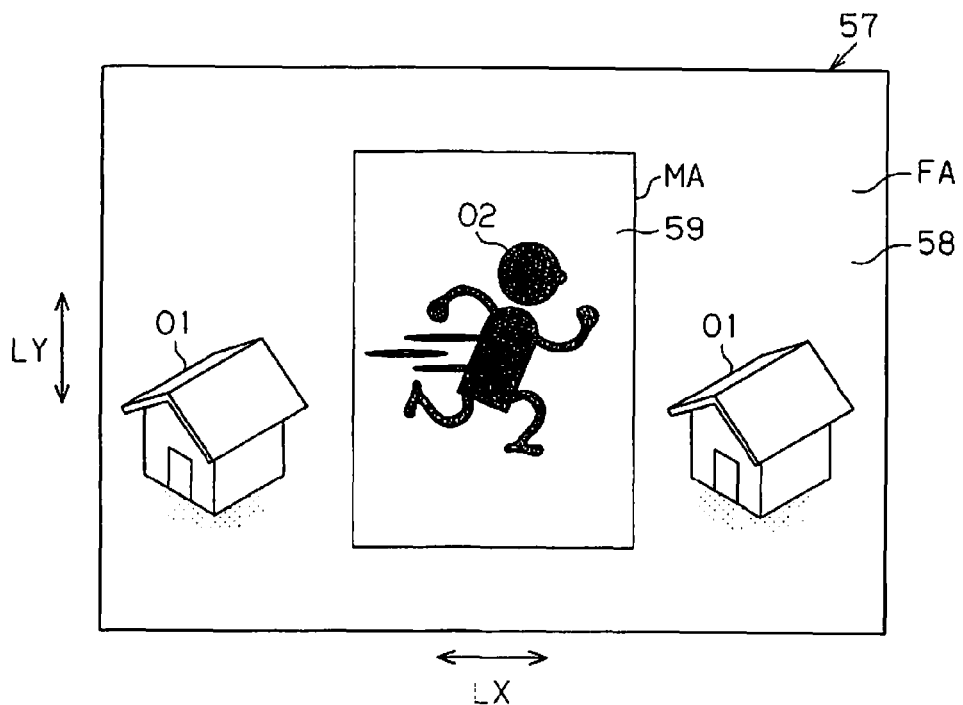
Fig. 7
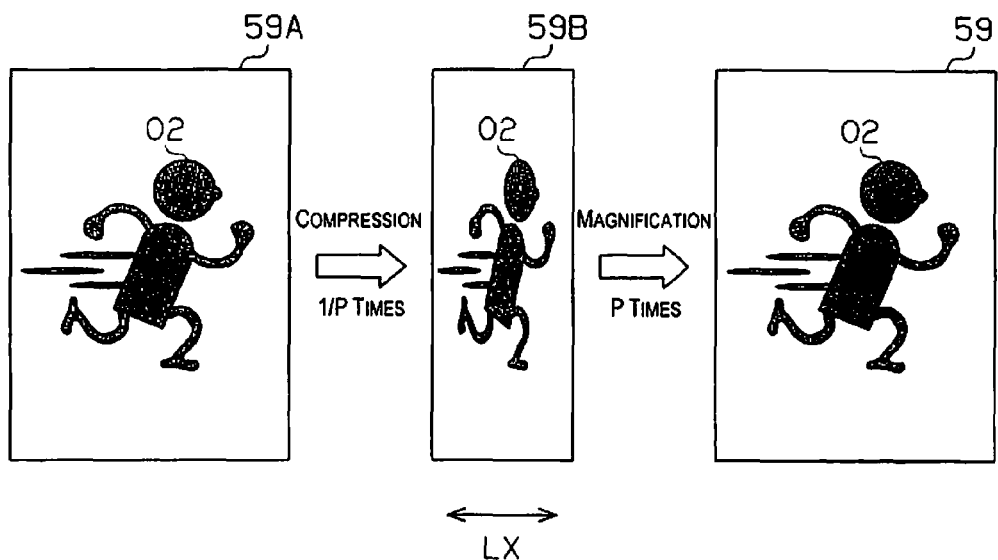
Fig. 8A  Fig. 8B  Fig. 8C

IMAGE GENERATION PROGRAM AND PRINTER FOR PRINTING COMPOSITE IMAGE ON A MEDIUM ARRANGED SO AS TO FACE A LENS LAYER HAVING A PLURALITY OF LENSES

CROSS-REFERENCE TO RELATED APPLICATIONS

This application claims priority to Japanese Patent Application No. 2013-161697 filed on Aug. 2, 2013. The entire disclosure of Japanese Patent Application No. 2013-161697 is hereby incorporated herein by reference.

BACKGROUND

1. Technical Field

The present invention relates to an image generation program and a printer for generating image data including a three-dimensional image and a two-dimensional image.

2. Related Art

A technology is disclosed, in which a three-dimensional image is printed on a lens sheet having a plurality of lenses (e.g., cylindrical lenses) such as lenticular lenses, etc., to enable three-dimensional visualization of an image (e.g., Japanese Unexamined Patent Application Publication No. 9-325440, Japanese Unexamined Patent Application Publication No. 2001-42462, and Japanese Unexamined Patent Application Publication No. 7-281327).

For example, Japanese Unexamined Patent Application Publication No. 9-325440 discloses a three-dimensional image generation method that generates a composite image in which a first image data (three-dimensional image data) of a linear image group in which a number of compression-converted linear images are arranged and a second image data (two-dimensional image data) of a plan image are arranged in a mixed manner in a recording medium arranged below a lenticular lens.

In the meantime, the composite image disclosed in Japanese Unexamined Patent Application Publication No. 9-325440 is generated by pasting an image (two-dimensional image) of a user's choice on a frame image in which a three-dimensional image provided to a user is arranged. By printing the composite image on a lens sheet, a three-dimensional image sheet capable of attaining three-dimensional visualization can be generated.

For example, the three-dimensional image sheet 90 shown in FIG. 12 is generated by printing the image 94 including the three-dimensional image 92 arranged in a frame area FA and the two-dimensional image 93 arranged in the area MA surrounded by the frame area FA on a printing surface of the lens sheet 91. In FIG. 12, the up-and-down direction in the figure corresponds to the longitudinal direction LY of the lens (cylindrical lens) and the right-and-left direction corresponds to the lens orthogonal direction LX (lens array direction).

In the meantime, in the three-dimensional image sheet 90, the resolution in the lens orthogonal direction LX is relatively coarse depending on the lens pitch. For this reason, even if the two-dimensional image is high in definition, the resolution depends on the lens coarse in resolution when observed. As a result, when the oblique line extending obliquely with respect to the lens longitudinal direction LY is observed through the lens, jaggy that looks a jagged line occurs. Further, in cases where the two-dimensional image 93 includes a person for example, although the eye of the person looks black by the image, there occurs a phenomenon that the eye of the person looks white when looked through the lens at a certain angle.

As mentioned above, in a composite image in which a three-dimensional image and a two-dimensional image are mixed, it is required to decrease a defect such as jaggy, etc., when a two-dimensional image is observed through a lenticular lens.

The aforementioned problems occur not only in a structure having a lens sheet including a lenticular lens but also in a structure in which a composite image is observed through a lens layer of another type. The same problem occurs not only when printing a composite image on a lens sheet but also when pasting a lens layer such as a lenticular lens after printing a composite image on a print medium or when forming a lens layer by, for example, an ink-jet record method on a print medium on which the composite image was printed.

SUMMARY

The present invention was made to solve the aforementioned problems and its object is to provide an image generation method and printer capable of generating an image that controls defects on image quality of a two-dimensional image such as jaggy, etc., when an image including a three-dimensional image and a two-dimensional image are observed through a lens layer.

Hereinafter, means for solving the aforementioned problems and its functions and effects will be described.

The method to solve the aforementioned problems is an image generation method for generating an image to be printed on a medium arranged so as to face a lens layer having a plurality of lenses, the image including a three-dimensional image and a two-dimensional image. The method comprises performing lossy compression for the two-dimensional image in a direction in which light focusing of the lenses occurs, and magnifying the two-dimensional image in the direction in which the light focusing of the lenses occurs after the lossy compression for the two-dimensional image has been performed.

Here, when an image is printed, the image can be printed on a single medium, a medium can be arranged so as to face a lens layer after printing, or an image can be printed on a medium arranged so as to face a lens layer.

According to this structure, the two-dimensional image for which the lossy compression is performed in a direction in which a light focusing of a lens occurs in a compression step is magnified in a direction in which the light focusing of the lenses occurs in a magnification step. Therefore, when an image printed on a medium is observed through a lens layer, defects on image quality such as jaggy, etc., can be reduced while maintaining the resolution of the three-dimensional image high.

In the method, the lens layer is constituted by a lenticular lens, and the direction in which the light focusing of the lenses occurs is a lens intersection direction intersecting with a longitudinal direction of the lenses.

According to this structure, the two-dimensional image compressed in the lens intersection direction in the compression step is magnified in the lens intersection direction in the magnification step. Therefore, when the image printed on the medium is observed through the lens layer, defects on image quality of the two-dimensional image such as jaggy, etc., can be reduced while maintaining the resolution of the three-dimensional image high.

In the method, the lossy compression for the two-dimensional image does not include compressing the two-dimensional image in the longitudinal direction of the lenses. According to this structure, defects on image quality such as jaggy, etc., can be reduced while suppressing deterioration of the resolution of the two-dimensional image in the lens longitudinal direction when the two-dimensional image is observed through the lens layer.

In the method, the number of pixels of the two-dimensional image before the lossy compression for the two-dimensional image in a direction parallel to a compression direction is equal to the number of the pixels of the two-dimensional image after the magnifying of the two-dimensional image in a direction parallel to a magnification direction.

According to this structure, since the number of pixels becomes equal in the compressing/magnifying direction of the two-dimensional image before and after compressing/magnifying the two-dimensional image, defects on image quality such as jaggy can be reduced while maintaining the size of the two-dimensional image before and after compression/magnification without deteriorating the resolution of the two-dimensional image when observed through the lens layer not so much.

In the aforementioned method, the lossy compression for the two-dimensional image uses one of methods selected from a bilinear method, a bicubic method, and a nearest-neighbor method, and the magnifying of the two-dimensional image uses one of methods selected from a bilinear method, a bicubic method, and a nearest-neighbor method.

According to this structure, since one of methods selected from the bilinear method, the bicubic method and the nearest-neighbor method is used to compress the two-dimensional image, compression for thinning out pixels in the lens intersection direction can be performed in a relatively short processing time. Further, since one of methods selected from the bilinear method, the bicubic method and the nearest-neighbor method is used to magnify the two-dimensional image after compression, magnification for interpolating pixels in the lens intersection direction in a relatively short processing time.

In the aforementioned method, the medium constitutes a lens sheet in state in which the medium is secured to a bottom surface of the lens layer, and the image generation method further comprises causing a printing section of a printer to print a generated image by performing a print instruction to print on the lens sheet. In this case, the computer that instructs printing in the print instruction step can be a device (a mobile terminal, a host device, a server, etc.) other than a printer, or a computer in a printer.

According to this structure, when observed through the lens layer, it is possible to print an image including a three-dimensional image capable of making a relatively high precision three-dimensional visualization (stereoscopic viewing, change, etc.) and a two-dimensional image reduced in defects on image quality such as jaggy on a lens sheet.

The printer that solves the aforementioned problems is a printer configured to print an image based on image data on a medium arranged so as to face a lens layer having a plurality of lens, the image data includes a three-dimensional image and a two-dimensional image, and the printer is provided with a compression processing section configured to perform lossy compression for the two-dimensional image in a direction in which the light focusing of the lenses occurs, an magnification processing section configured to magnify the two-dimensional image, which has been compressed, in a direction equal to the direction in which the two-dimensional image has been compressed, and a printing section configured to print the image after the two-dimensional image is magnified by the magnification processing section on the medium arranged so as to face the lens layer having the plurality of the lenses. When the image is printed, the medium can be in a single state or in a state of being arranged so as to face the lens layer. The two-dimensional image for which the lossy compression is performed in a direction that the light focusing of the lenses occurs by the compression processing section is magnified in a direction that the light focusing of the lenses occurs by the magnification processing section. Therefore, when the image printed on the medium is observed through the lens layer, defects on image quality of the two-dimensional image such as jaggy can be reduced while maintaining the resolution of the three-dimensional image high.

BRIEF DESCRIPTION OF THE DRAWINGS

Referring now to the attached drawings which form a part of this original disclosure:

FIG. 7 is a top view showing an image including a three-dimensional image and a two-dimensional image;

FIG. 8A is a schematic view showing compression/magnification processing of a two-dimensional image;

FIG. 8B is a schematic view showing the compression/magnification processing of the two-dimensional image;

FIG. 8C is a schematic view showing the compression/magnification processing of the two-dimensional image;

DETAILED DESCRIPTION OF EXEMPLARY EMBODIMENTS

Hereinafter, an embodiment of a program and a printer will be explained based on FIGS. 1 to 11.

Figure 1:
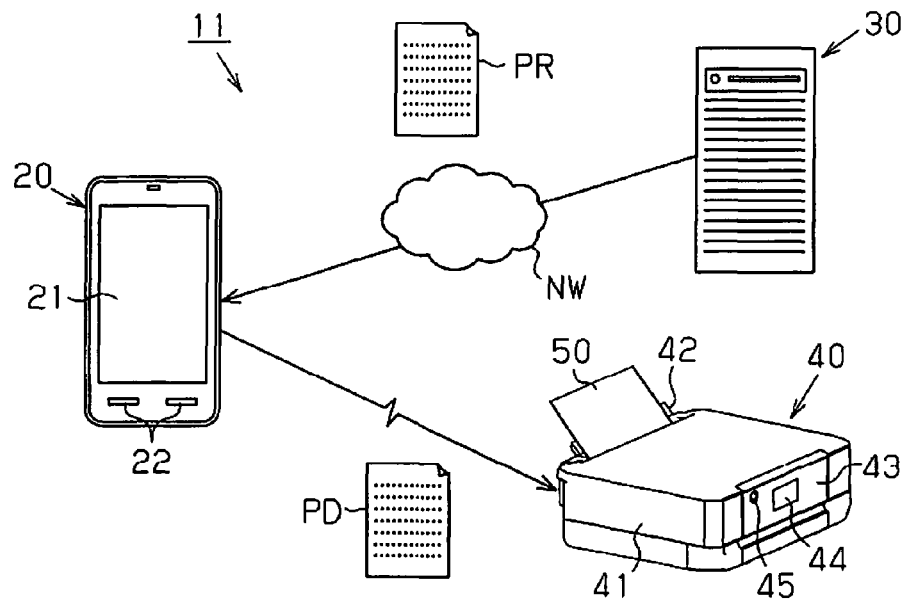
FIG. 1 is a schematic view showing a print system according to one embodiment.

The print system 11 shown in FIG. 1 is a system that can print an image (composite image) in which a three-dimensional image and a two-dimensional image are mixed on a lens sheet. The print system 11 is provided with a mobile terminal 20 configured to be operated by a user to display or print a print image, a server 30 that provides contents to the mobile terminal 20 for the purpose of printing a three-dimensional image, and a printer 40.

In the server 30, plural types of contents are stored. A user downloads a program PR and desired contents including three-dimensional image data GD from the server 30 through the Internet NW to the mobile terminal 20 at charge or no charge.

The mobile terminal 20 is provided with a display section 21 and an operation section 22, and is capable of giving various kinds of instructions by touching the screen of the display section 21. In the display section 21, a preview that can confirm the image of a print target before printing can be performed. Further, if it is OK by the preview confirmation, a user gives a print execution instruction by the operation of the operation section 22 or the screen touch operation. At this time, a user sets necessary print conditions in advance. One of print conditions is a "print mode."

The print mode includes a "high image quality mode" that prioritizes a print quality than a print speed, a "low image quality mode" that prioritizes a print speed than a print quality, etc. When a user performs an operation to give a print execution instruction by the mobile terminal 20, the print data PD is transmitted from the mobile terminal 20 to the printer 40.

As a mobile terminal 20, a smartphone, a mobile phone, a tablet PC, a personal digital assistant (PDA (Personal Digital Assistants)), etc., can be used. In place of the mobile terminal 20, a non-portable type host device can be used. For example, a personal computer can be used.

The printer 40 is provided with a main body 41 having an approximately rectangular parallelepiped shape, a manual feeding section 42 provided at a rear surface side of the main body 41 and capable of setting a medium, an operation panel 43 formed on the front face (right front side in FIG. 1) of the main body 41. A lens sheet 50 as one example of a medium is set to the feeding section 42 in an inclined posture. The operation panel 43 is provided with a display section 44 and an operation section 45. In this embodiment, the touch panel function of the display section 44 also constitutes a part of the operation section. The printer 40 feeds the lens sheet 50 upon receipt of print data PD and prints an image including a three-dimensional image and a two-dimensional image based on the print data PD.

Figure 2:
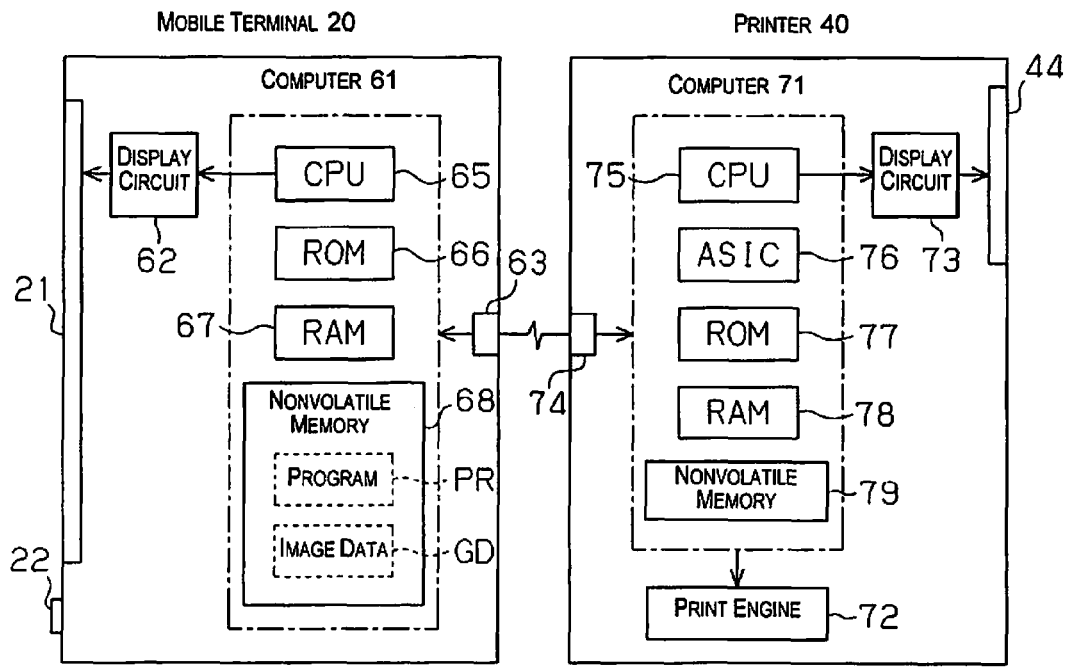
FIG. 2 is a block diagram showing an electrical constitution of a mobile terminal and a printer.

Next, the electrical constitutions of the mobile terminal 20 and the printer 40 will be explained using FIG. 2. As shown in FIG. 2, the mobile terminal 20 is equipped with a computer 61, a display circuit 62, and a communication section 63.

Further, the mobile terminal 20 has built-in communication circuit, microphone, speaker (not illustrated), etc. The computer 61 is equipped with a CPU 65 (central processing unit), a ROM 66, a RAM 67, and a nonvolatile memory 68 as an example of a recording section. The ROM 66 stores various kinds of programs for realizing various functions for the mobile terminal 20, such as a program for realizing a telephone function. The nonvolatile memory 68 stores a program PR constituting contents downloaded from the server 30 and image data GD including a three-dimensional image. The CPU 65 performs image generation processing by executing the program PR. The CPU 65 transmits the image data generated by image generation processing to the printer 40 to give a print instruction of the image on the lens sheet 50 to the printer 40.

Further, as shown in FIG. 2, the printer 40 is equipped with a computer 71 that performs entire control, a print engine 72 as an example of the printing section, a display circuit 73 and a communication section 74. The mobile terminal 20 and the printer 40 can be wirelessly communicated with each other via the communication sections 63 and 74. The transmission of the print data PD from the mobile terminal 20 to the printer 40 is performed wirelessly via the communication sections 63 and 74.

The computer 71 shown in FIG. 2 is provided with a CPU 75 (central processing unit), an ASIC 76 (application specific IC), a ROM 77, a RAM 78, and a nonvolatile memory 79 as an example of the recording section. The ROM 77 stores various kinds of programs for realizing various functions of the printer 40. The nonvolatile memory 79 stores various control programs, etc., required for various kinds of controls of the printer 40.

In cases where the printer 40 is configured to be able to communicate with the server 30, the program PR and the image data GD downloaded from the server 30 can be stored in the nonvolatile memory 79. In this case, the computer 71 executes the program PR to generate image data including a three-dimensional image and a two-dimensional image suitable for printing onto the lens sheet 50.

The print engine 72 shown in FIG. 2 is equipped with a print head 48 (see FIGS. 4 and 5), and a conveyance motor as a power source of a conveyance mechanism including conveyance roller pair 46 (see FIG. 4, etc.) for conveying a print medium such as a lens sheet 50, a paper, etc. When the printer 40 accepts printing of a lens sheet 50, the print engine 72 prints the image by the print head 48 while conveying the lens sheet 50 by driving the conveyance mechanism.

Figure 3:
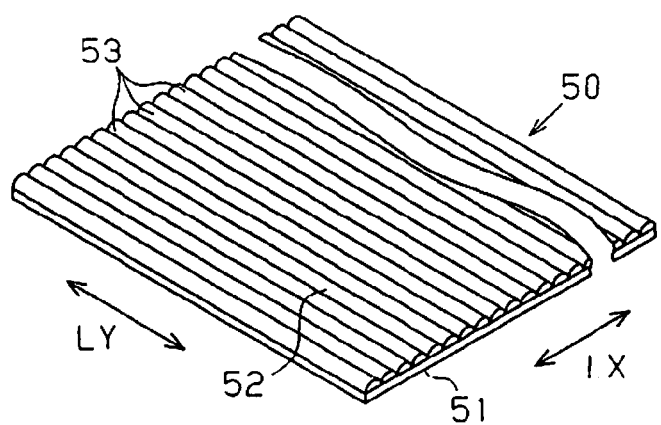
FIG. 3 is a partially broken perspective view showing a lens sheet.

As shown in FIG. 3, the lens sheet 50 includes an ink absorbing layer 51 and a lens layer 52. The ink absorbing layer 51 is made of a film formed by a high ink absorbent material, and is bonded to the bottom surface of the lens layer 52 via an adhesive tape or an adhesive agent having translucency. Needless to say, the ink absorbing layer 51 can be welded to the bottom surface of the lens layer 52. The ink absorbing layer 51 is constituted as an example of a medium to be arranged so as to face the lens layer 52, and in this embodiment, bonded to the bottom surface of the lens layer 52 to constitute a part of the lens sheet 50.

As shown in FIG. 3, in the lens layer 52, a plurality of lenses 53 are formed so as to extend in one direction in parallel with each other in an adjacently arranged manner. The lens layer 52 of this embodiment is a lenticular lens in which the lens 53 is a cylindrical lens. The lens 53 has a semicircle shape in cross-section perpendicular to the longitudinal direction. In the following explanation, in the lens sheet 50, in some cases, the longitudinal direction of the lens 53 may be referred to as a "lens longitudinal direction LY," and a direction perpendicular to the lens longitudinal direction may be referred to as a "lens orthogonal direction LX."

Figure 4:
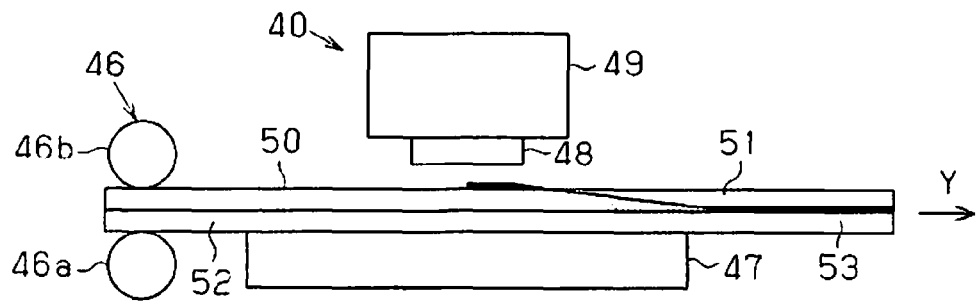
FIG. 4 is a side view showing the structure of a print engine for printing a lens sheet.
Figure 5:
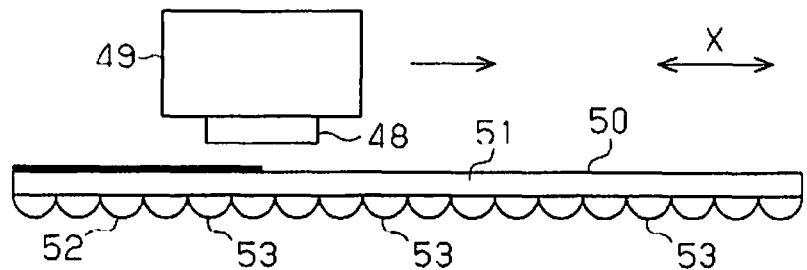
FIG. 5 is a front view showing the structure of the print engine for printing the lens sheet.
Figure 6:
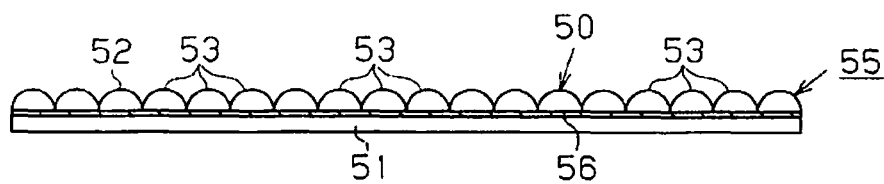
FIG. 6 is a front view showing the three-dimensional image sheet.

FIGS. 4 to 6 show formation processes of the three-dimensional image sheet 55. The three-dimensional image sheet 55 capable of three-dimensionally visualizing an image is formed by printing a three-dimensional image on a printing surface of the lens sheet 50. The lens sheet 50 set to the feeding section 42 of the printer 40 shown in FIG. 1 is fed to the print start position in the main body 41 when printing is initiated. As shown in FIG. 4, in the main body 41, a conveyance roller pair 46 having a drive roller 46a and a driven roller 46b opposed to each other via a conveyance path is arranged. The lens sheet 50 is conveyed by the driving of the conveyance roller pair 46 toward the downstream side in the conveyance direction Y while being supported by the support platform 47. The print head 48 opposed to the support platform 47 via the conveyance path is fixed to the lower portion of a carriage 49 movable in a direction intersecting with the conveyance direction Y. Ink drops from the nozzle of the print head 48 are ejected toward the surface (printing surface) of the portion of the lens sheet 50 supported by the support platform 47 to perform printing. As shown in FIG. 4, the ink impact-landed to the printing surface of the lens sheet 50 is absorbed by the ink absorbing layer 51 to reach the vicinity of the bottom surface (boundary surface) of the lens layer 52. The support surface of the support platform 47 can be formed into an irregular surface having a protruded portion semicircular in cross-section capable of being engaged with the irregular shape of the lens 53 of the lens layer 52.

As shown in FIG. 5, the carriage 49 moves reciprocally by the driving force of a not-illustrated carriage motor in a main scanning direction X intersecting with the conveyance direction Y. The print head 48 ejects ink drops from the nozzle in the middle of moving in the main scanning direction X. A printing operation in which the carriage 49 accompanied by ejection of ink drops is moved once in the main scanning direction X and a conveyance movement in which the carriage 49 is intermittently moved in the conveyance direction Y are performed approximately alternately, to thereby print an image on the printing surface of the lens sheet 50. The ink impact-landed on the printing surface of the ink absorbing layer 51 is absorbed by the ink absorbing layer 51 and penetrates to the vicinity of the interface with the lens layer 52 and fixed thereto. The ink absorbing layer 51 is formed by a transparent material except for a white surface layer. For this reason, the image is observed through the lens layer 52 as if it is arranged on a white background.

Thus, a three-dimensional image sheet 55 shown in FIG. 6 is produced. As shown in FIG. 6, in the three-dimensional image sheet 55, a three-dimensional image 56 is formed between the ink absorbing layer 51 and the lens layer 52. The three-dimensional image 56 includes a change image in which a plurality of images change in turn by changing the observation angle through the lens layer 52, a stereoscopic image in which an object in the image 56 can be three-dimensionally visualized when an image for a left eye and an image for a right eye are observed with a left eye and a right eye, respectively, through the lens layer 52, etc. In the following explanation, the lens sheet 50 may sometimes be simply referred to as a "sheet 50."

FIG. 7 shows an image 57 (image data) before the image 56 to be printed on the lens sheet 50 is converted into print data of a CMYK color system. The image 57 is composed of, for example, image data of a RGB color system. When the original image is JPEG data, etc., it is converted from a YUV color system into a RGB color system. The image 57 includes a three-dimensional image 58 and a two-dimensional image 59. In detail, the image 57 includes a three-dimensional image 58 arranged in a frame area FA and a two-dimensional image 59 to be arranged in an area MA surrounded by the frame area FA. The three-dimensional image 58 is a change image or a stereoscopic image. In the three-dimensional image 58, an object O1 (object) ("house" in the example of FIG. 7) capable of being three-dimensionally visualized is illustrated, and in the two-dimensional image, an object O2 ("human" in the example of FIG. 7) is illustrated.

Figure 9:
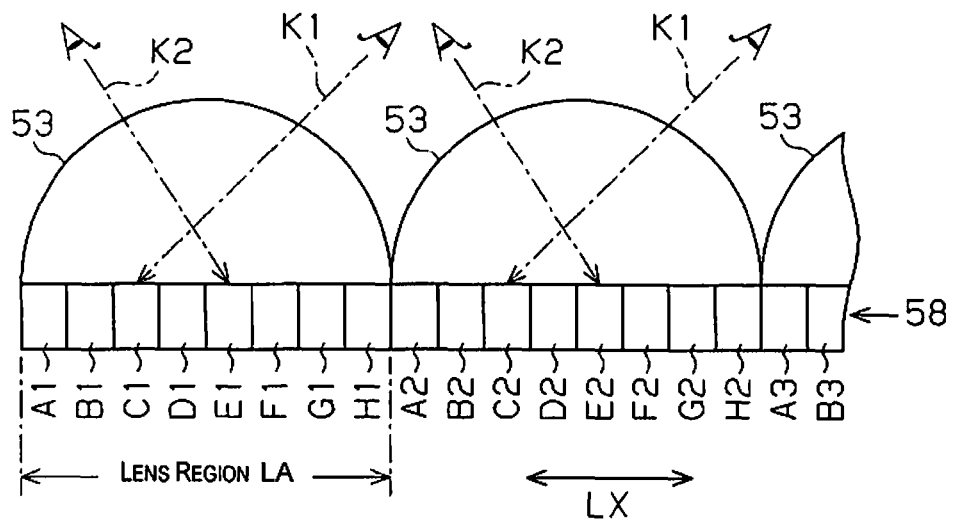
FIG. 9 is a cross-sectional view showing a part of a three-dimensional image of a three-dimensional image sheet.

In FIG. 7, the three-dimensional image 58 is shown as one sheet of image capable of being observed through the lens layer 52. Actually, as shown in FIG. 9, a total of N×M division compressing images (hereinafter may be referred to as "linear image") A1-H1, A2-H2, etc., divided each of a plurality (N sheets) of images A-H constituting the three-dimensional image 58 compressed at 1/N times in the lens orthogonal direction LX by the same number as the number M of lens in the lens orthogonal direction LX are arranged.

The image data GD to be supplied from the server 30 is, for example, frame image data in which the area MA is in an empty state in the image 57 shown in FIG. 7 and the three-dimensional image 58 is arranged in the frame area FA. A user generates image (composite image) data to be printed on the lens sheet 50 by pasting a two-dimensional image 59A (shown in FIG. 8A), such as, e.g., a favorite picture photographed by a camera, etc., or a desired painting, on the area MA. By printing the self-produced image on the lens sheet 50 by a printer 40, a user can produce a three-dimensional image sheet 55 containing a composite image in which the user's favorite picture or painting is surrounded by the three-dimensional image 58 in the frame area FA.

Needless to say, the image data GD of the image 57 in which the three-dimensional image 58 and the two-dimensional image 59 coexist can be provided as contents by the server 30. Further, in the image 57, the two-dimensional image 59 and the three-dimensional image 58 can be arranged in the frame area FA and the area MA, respectively. Further, the image 57 can be an image in which the three-dimensional image generated from the image data of a picture or a painting by a user uniquely coexist.

When printing the image 57 on the lens sheet 50, the user gives a print instruction by operating the mobile terminal 20. The CPU 65 received the instruction executes the program PR to perform image generation processing. Here, the image generation processing denotes processing that preliminarily performs a picture adjustment so that the three-dimensional image 58 and the two-dimensional image 59A in the image 57 of the RGB color system have a suitable image quality when observed through the lens layer 52 after printing. In this embodiment, as the image generation processing, compression and magnification processing are performed for the two-dimensional image 59A in the image 57.

As shown in FIGS. 8A-C, the two-dimensional image 59A is compressed at a predetermined compression ratio in the lens orthogonal direction LX (Compression Step). Next, the compressed two-dimensional image 59B is magnified at a predetermined magnification ratio in the lens orthogonal direction LX to generate a two-dimensional image 59. In this example, the predetermined compression ratio and the predetermined magnification ratio are set so that the number of pixels of the two-dimensional image in the lens orthogonality direction LX becomes equal before compression and after magnification. Further, the two-dimensional image will not be compressed in the lens longitudinal direction LY. Therefore, the two-dimensional image after compression will not be magnified in the lens longitudinal direction LY.

In this embodiment, lossy compression processing and lossy magnification processing which use known interpolation are used. As the compression processing, for example, one of methods selected from, for example, a bilinear method (linear interpolation), a bicubic method, and a nearest-neighbor method is used. Further, as the magnification processing, one of methods selected from, for example, a bilinear method, a bicubic method, and a nearest-neighbor method (shortest distance method) is used. In the compression processing and the magnification processing, the same method can be used, or different methods can be used.

Here, in the bilinear method, at the time of compression, an average color of a plurality of pixels in the compression direction is calculated and its average color is allotted to converted pixels. At the time of magnification, pixels are interpolated using the color value of a total of four surrounding pixels.

In the bicubic method, at the time of compression, the color value of pixel is determined using a weighted average. At the time of magnification, pixels are interpolated from the color values of the surrounding 16 (4×4) pixels using the three-dimensional function.

The nearest-neighbor method calculates the coordinate before change and the coordinate after change at the pixel unit and allots the color before change to the moved pixel.

The compression ratio of the two-dimensional image is preferably selected from the value within the range of 1/10 to 1/2 times. Especially, it is more preferable that the value is within the range of 1/6 to 1/3 times. When the compression ratio is 1/P times, the magnification ratio is P times. In this embodiment, as one example, a bilinear method is used for compression/magnification, and the compression ratio is set to 1/4 times, and the magnification ratio is set to 4 times.

Here, the compression processing and magnification processing for the two-dimensional image is performed only in the lens orthogonality direction LX, and not performed in the lens longitudinal direction LY. This is to maintain the resolution of the two-dimensional image 59A in the lens longitudinal direction LY which is a direction that an image is not magnified by the lens 53. Further, as to the three-dimensional image 58, in order to maintain the lens longitudinal direction LY and the lens orthogonal direction LX and its resolution, compression processing and magnification processing will not be performed.

As shown in FIG. 9, in the area within the width of the lens 53 (hereinafter referred to as "lens area LA," N pieces of images among N×M pieces of linear images A1 to H1 obtained by dividing N pieces of images (N is a natural number of 2 or more) compressed 1/N times in the lens orthogonal direction by the same number M of lens are arranged in the order of changing images. N pieces (e.g., 8 pieces) of original images are defined as an image A, an image B, and an image C, . . . , an image H, and corresponding linear images are defined as linear images A1-AM, linear images B1-BM, . . . , linear images H1-HM. In the lens area LA, the linear images A1, B1, . . . , H1 existing at the same position in the lens orthogonal direction LX are arranged in the order of changing. As shown in FIG. 9, the direction along which the linear images Ai, Bi, . . . , Hi (i=1, 2, 3, . . . M) are arranged (the right-and-left direction in FIG. 9) is an arranging direction of linear images, and this direction coincides with the lens orthogonal direction LX.

In FIG. 9, when observed along the line of sight K1 at a right obliquely upward angle, linear images C1, C2, . . . , CM are observed through each lens 53, and an image C is observed as a whole. Further, in FIG. 9, when observed along the line of sight K2 at a left obliquely upward angle, linear images E1, E2, . . . EM are observed through each lens 53, and an image E is observed as a whole. By changing the observation angle, visible images change in the order of images A, B, C, . . . , H. In FIG. 9, although an example was shown in which the three-dimensional image is a change image, the three-dimensional image can be a stereoscopic image. In the stereoscopic image, for example, the M pieces of linear images that the image for left eye is M-divided by the same number as the number of lenses and the M pieces of linear images that the image for right eye is M-divided by the same number as the number of lenses are arranged alternately in the lens orthogonal direction LX in a state in which each image is compressed by 1/N times in the lens orthogonal direction LX.

Further, as show in FIG. 9, the surface shape of the cross-section of the lens 53 taken along the lens orthogonal direction LX is a semicircle shape, and the light flux having a width in the lens orthogonal direction is focused by the convex curved surface of the semicircle shape. In this lens 53, the lens orthogonal direction LX is a direction that light collection occurs.

Figures 10A, 10B:
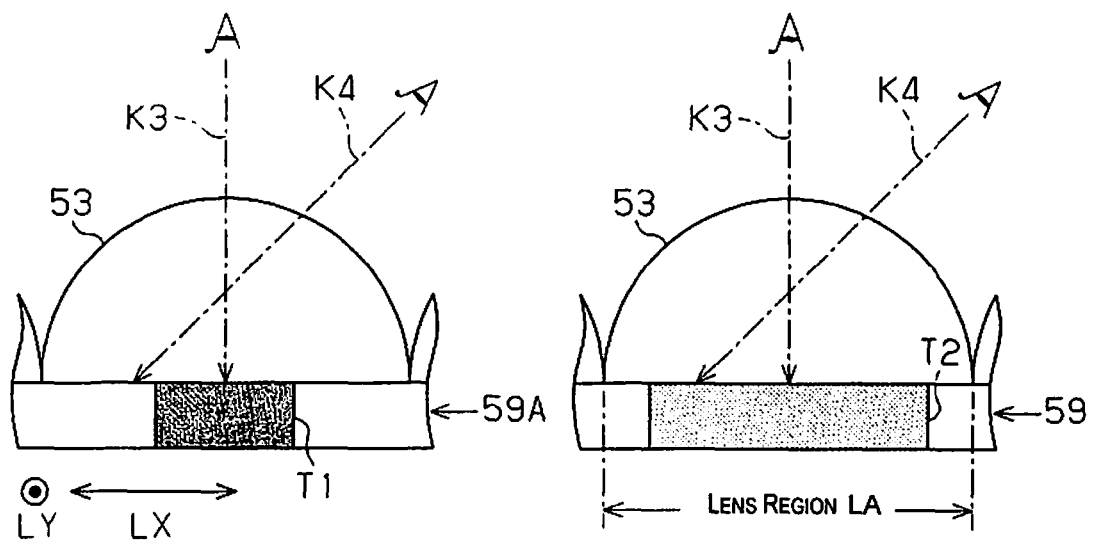
FIG. 10A is a cross-sectional view showing a part of a two-dimensional image in an example in which no compression/magnification processing is made in a three-dimensional image sheet.
FIG. 10B is a cross-sectional view showing a part of a two-dimensional image to which compression/magnification processing was made.

FIG. 10 shows a part of the two-dimensional image in the three-dimensional image sheet 55. FIG. 10A shows an example of the two-dimensional image printed without performing compression/magnification, and FIG. 10B shows an example of the two-dimensional image printed after performing compression/magnification.

As shown in FIG. 10A, in cases where the printed two-dimensional image 59A with no compression/magnification is observed through the lens 53, when observed along the line of sight K3 at the upper angle (about 90 degrees), the object T1 looks dark gray for example, but when observed along the line of sight K4 at a right obliquely upward angle, the object disappears and looks white for example. That is, even if the two-dimensional image is high in resolution, the resolution in the lens orthogonal direction LX when observed through the lens 53 depends on the lens 53 low in resolution, and therefore a phenomena that a part of the two-dimensional image 59A disappears depending on the observation angle occurs. For example, jaggy occurs in which for example an oblique line in the two-dimensional image 59A extending obliquely with respect to the lens longitudinal direction LY looks jaggy every lens pitch. Further, in an example in which a person exists in the two-dimensional image 59A, a phenomenon that the black of eye of the person changes into a while of eye depending on the observation angle occurs.

On the other hand, as shown in FIG. 10B, when viewed the two-dimensional image 59 printed after performing lossy compression/magnification through the lens 53, even if it is observed along the line of sight K3 at an upper angle or along the line of sight K4 at a right obliquely upward angle, the object T2 looks black (in a precise sense, dark gray color). In other words, even if the angle at which the two-dimensional image 59 is observed changes, a phenomenon that a part of the image disappears hardly occurs. This controls occurrence of jaggy of an oblique line extending obliquely with respect to the lens longitudinal direction LY. Further, the black of eye of a person looks a black of eye even if the observation angle changes.

Further, it is preferable that the compression ratio 1/P is the number N of images constituting the three-dimensional image 58, i.e., the value corresponding to the number N of the linear images in the lens area LA. For example, it is preferable that the compression ratio is selected form 1/N times, 2/N times, 3/N times, . . . , (N−1)/N times. It is especially preferable to select the compression ratio within the range of 1/10 times to 1/2 times among the aforementioned compressing ratios. In this condition, in the example of N=8, it is selected from 1/8 times, 1/4 times, 3/8 times, and 1/2 times. However, in this condition, in the example of N=2, it is only 1/2 times. For this reason, as options of the compression ratio, it is preferable to add 1/4 N times, 1/3 N times, 1/2 N times. Under this condition, even if N=2, it is possible to select the compression ratio among 1/8 times, 1/6 times, 1/4 times, and 1/2 times. It should be noted that the compression ratio is not limited to the above, and can be arbitrarily set within the range of, for example, 0.05-0.95.

In this embodiment, the functional portion of software is constituted by the CPU 65 that executes the program PR. The computer 61 is equipped with, as functional portions, a compression processing section that compresses image data of the two-dimensional image 59A, a magnification processing section that magnifies the image data of the two-dimensional image 59B after compression, and a composite processing section that composite the image data of the two-dimensional image 59 after magnification and the image data of the three-dimensional image 58 to generate the image 57. Further, in cases where the CPU 75 in the printer 40 executes the program PR, the computer 71 is equipped with similar compression processing section, magnification processing section, and composite processing section. Further, in cases where the program PR is executed by the computer in the server 30, the computer in the server 30 is equipped with similar compression processing section, magnification processing section, and composite processing section.

Next, using FIG. 11, the function of the mobile terminal 20 having a computer 61 for executing the program PR will be explained.

In the nonvolatile memory 68 of the mobile terminal 20, the program PR and the image data GD contained in contents preliminarily downloaded from the server 30 are stored. The image data GD is frame image data of the three-dimensional image. A user stores the two-dimensional image data such as a picture or a desired painting preliminarily photographed using a camera or a camera function of the mobile terminal 20 in the nonvolatile memory 68. The user generates the image 57 by pasting a desired two-dimensional image data in the area MA of the frame image GD displayed on the display section 21 of the mobile terminal 20. In some cases, the image data GD contained in contents downloaded from the server 30 is data in which a two-dimensional image is preliminarily pasted on the frame image of a three-dimensional image.

Prior to instruct a print execution, the user operates the mobile terminal 20 to select the image 57 and set the print conditions. The print conditions include a print mode (high image quality/low image quality), a print color (color/gray scale), a medium type (a normal paper, a photograph, a postcard, lens sheet, etc.), and a medium size (A4 size, B5 size, postcard, L size, etc.). The user selects, for example, a high image quality mode as a print mode, a color as a print color, a lens sheet as a medium type, and a postcard size as a medium size. The user operates the mobile terminal 20 to instruct a print execution in a state in which the lens sheet 50 is set to the feeding section 42 of the printer 40.

Figure 11:
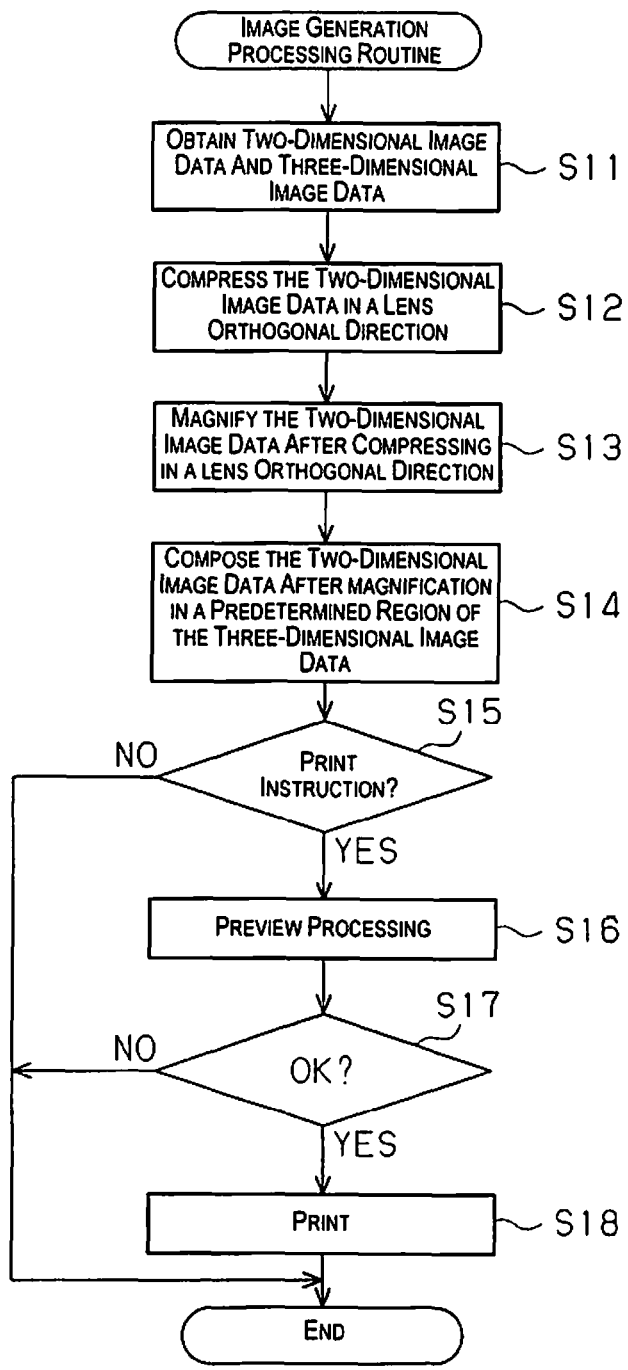
FIG. 11 is a flow chart showing an image generation processing routine.
Figure 12:
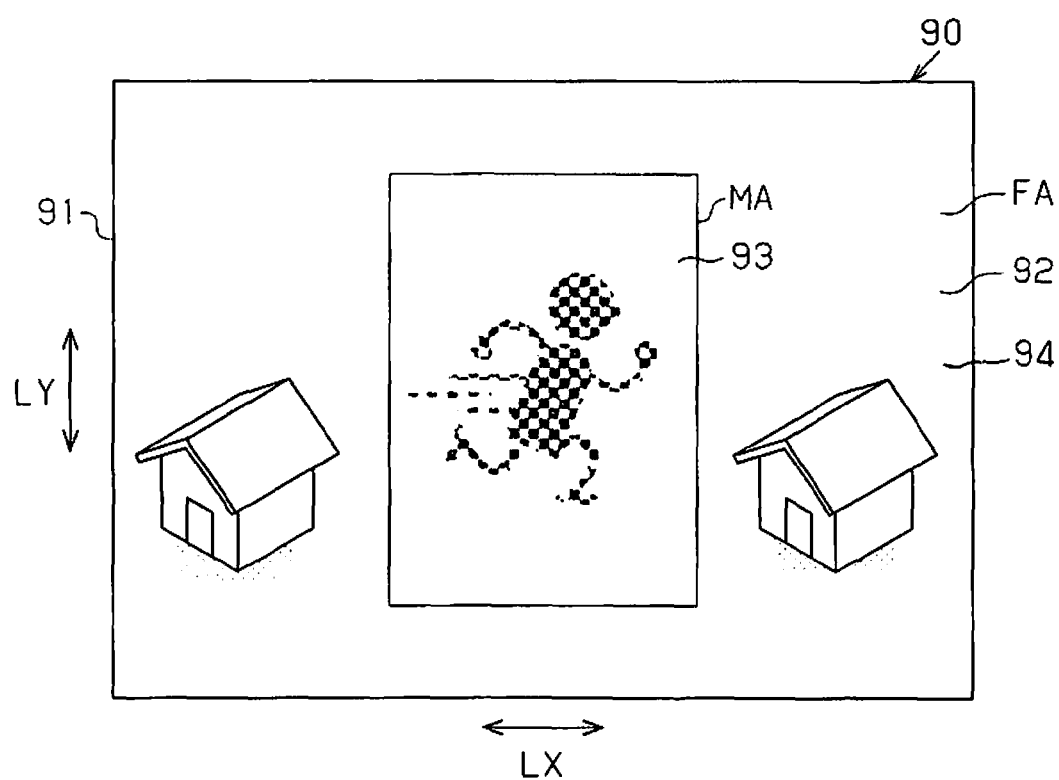
FIG. 12 is a plan view showing an example of a three-dimensional image sheet including a three-dimensional image and a two-dimensional image in a conventional technique.

When received a predetermined operation, the CPU 65 executes the program PR shown in FIG. 11 read out from the nonvolatile memory 68 to perform image generation processing. In this example, making the operation of fixing the image 57 completed by pasting the two-dimensional image 59A in the area MA as a trigger, an image generation processing routine is executed. Hereinafter, the image generation processing will be explained according to FIG. 11. In the following explanation, in some cases, the three-dimensional image 58 is referred to as three-dimensional image data 58, the two-dimensional image 59A is referred to as a two-dimensional data 59A, and the image 57 is referred to as image data 57.

Initially, in Step S11, two-dimensional image data and three-dimensional image data are obtained. That is, the image data 57 in which the three-dimensional image 58 and the two-dimensional image 59A are mixed is obtained.

In Step S12, the two-dimensional image data is compressed in the lens orthogonal direction. That is, the two-dimensional image data 59 is taken out from the image data 57, and the two-dimensional image data 59A shown in FIG. 8A is compressed at a predetermined compression ratio (e.g., 1/P times) in the lens orthogonality direction LX to obtain compressed two-dimensional image data 59B shown in FIG. 8B. This compression processing is performed by, for example, a bilinear method, and the two-dimensional image data 59A is compressed, for example, at 1/4 times. This step S12 corresponds to the compression step.

In Step S13, the compressed two-dimensional image data 59B is magnified at a predetermined magnification ratio in the lens orthogonal direction LX. In this embodiment, the predetermined compression ratio and the predetermined magnification ratio are set so that the number of pixels of the image 59A before compression and the number of pixels of the image after magnification become equal in the lens orthogonal direction LX. The two-dimensional image data 59B after compression as shown in FIG. 8B is magnified at a predetermined magnification ratio (e.g., P times) in the lens orthogonal direction LX to obtain the two-dimensional image data 59 after compression as shown in FIG. 8C. This magnification processing is performed by, for example, a bilinear method to magnify the two-dimensional image data 59B, for example, four times. Next, this step S13 corresponds to a magnification step.

In Step S14, the two-dimensional image data after compression is composed with the three-dimensional image data. That is, the two-dimensional image data 59 after magnification as shown in FIG. 8C is composed in the predetermined area MA of the three-dimensional image data 58 to generate the image data 57 (composite image data) as shown in FIG. 7. The composite position at this time is performed by the operation section 22 or the screen touch operation at the time of generating the image 57 by the user in accordance with the position coordinate of the two-dimensional image 59 positioned with respect to the frame of the three-dimensional image 58. This Step S14 corresponds to an Image generation step.

When the image data 57 is generated as a result of the image generation processing executed by an image fixing operation by a user as a trigger, the user instructs a print execution after setting the print conditions by the operation of the mobile terminal 20.

In Step S15, it is judged whether or not a print instruction is received. When a print instruction has not been received for a certain period of time, the routine is terminated. On the other hand, when a print instruction has been received for a certain period of time, the routine proceeds to Step S16. Even after the routine termination, the generated image data 57 is temporarily stored and printable if necessary.

In Step S16, preview processing is performed. That is, a print image is displayed on the display section 21. For example, in the preview screen, when a frame feed processing is performed, the image observed when observing the print image through the lens layer 52 is displayed one by one in the order of changing the observation angle. Further, when a reproduction operation is performed, a plurality of changing images are displayed by animation. The user confirms the previewed print image, and if the print image is inappropriate in terms of image quality, etc., the user stops the printing, and if the print image is acceptable, the user operates to give an OK instruction.

In Step S17, it is judged whether or not it is OK. If it is not OK, the routine is terminated, and if it is OK, the routine proceeds to Step S18.

In Step S18, a print execution is instructed to the printer 40. For example, the print data PD in which a header is attached to the image data 57 is transmitted to the printer 40 to instruct a print execution.

The printer 40 converts the image data 57 in the received print data PD into print data of a predetermined gradation in a CMYK color system, and controls the print engine 72 based on the command and the print data in the header to print the image 57 on the lens sheet 50. It can be configured such that the computer 61 of the mobile terminal 20 performs up to the processing of converting the image data 57 into the print data PD of the predetermined gradation in the CMYK color system and transmits the print data PD with a header to the printer 40. Further, it also can be configured such that the computer in the server 30 executes the program PR in response to the request from the mobile terminal 20 to generate image data 57, and the mobile terminal 20 downloaded the image data 57 instructs image print based on the image data 57 to the printer 40.

Thus, in the three-dimensional image sheet 55 produced by printing the image 56 on the lens sheet 50, as shown in FIG. 10B, since two-dimensional image 59 is observed even if the observation angle is changed, for example, jaggy of the oblique line obliquely intersecting with the lens longitudinal direction LY can be controlled. Further, the phenomenon that the black of eye of a person looks while when the observation angle is changed can be reduced or eliminated. When the image 56 is observed through the lens layer 52 while changing the observation angle, the two-dimensional image 59 having no defect of picture quality such as jaggy, etc., as shown in FIG. 7 can be observed. The operation which becomes a trigger for initiating the execution of image generation processing routine is not limited to the image fixing operation, and can be an image creation instruction operation, a preview instruction operation, or a print instruction operation.

Hereinafter, according to this embodiment detailed above can exert the following effects.

(1) The computer 61, 71 for executing the program PR performs the image generation processing for generating the image containing the three-dimensional image and the two-dimensional image to be printed on the lens sheet 50. The program PR is equipped with a compression step (S12) that performs lossy compression for the two-dimensional image 59A in the direction LX that light focusing of the lens 53 occurs and a magnification step (S13) that magnifies the two-dimensional image 59B after compression in the compression step in the direction LX that light focusing of the lens 53 occurs. Therefore, when the image 56 printed on the lens sheet 50 is observed through the lens layer 52, defects of print quality of the two-dimensional image 59 such as jaggy, etc., can be reduced while maintaining the resolution of the three-dimensional image 58 high.

(2) The lens layer 52 is constituted by a lenticular lens, and in the compression step (S12) and the magnification step (S13), compression and magnification is performed against the two-dimensional image in the lens orthogonal direction LX. Therefore, when the image 56 is observed through the lens layer 52 (lenticular lens), defects on print quality of the two-dimensional image 59 such as jaggy, etc., can be reduced while maintaining the resolution of the three-dimensional image high.

(3) In the compression step (S12), no lossy compression is made in the lens longitudinal direction LY of the two-dimensional image 59. Therefore, when the image 59 is observed through the lens layer 52, defects on print quality of the two-dimensional image such as jaggy, etc., can be reduced while controlling deterioration of the resolution of the two-dimensional image in the lens longitudinal direction LY.

(4) The number of pixels in the direction parallel to the compression direction of the two-dimensional image before compression in the compression step (S12) and the number of pixels of the two-dimensional image after magnification in the magnification step (S13) in the direction parallel to the magnification direction. That is, the two-dimensional image 59B compressed 1/P times in the lens orthogonal direction LX is magnified P times. Therefore, while maintaining the size and aspect ratio of the two-dimensional image and the object O2 therein before and after the compression/magnification, defects on print image such as jaggy can be reduced without deteriorating the resolution of the two-dimensional image 59 when observed through the lens layer 52 not much.

(5) In the compression step (S12), using one of methods selected among a bilinear method, a bicubic method, and a nearest-neighbor method, the two-dimensional image is compressed. In the magnification step, using one of methods selected among a bilinear method, a bicubic method, and a nearest-neighbor method, the two-dimensional image after compression is magnified. Therefore, it is possible to perform compression of the two-dimensional image 59A that pixels are thinned in the lens orthogonal direction in a relatively short processing time, and also to perform magnification that pixels of the two-dimensional image 59B after compression are interpolated in the lens orthogonal direction LX in a relatively short processing time.

(6) It is configured to perform printing on a lens sheet 50 in which an ink absorbing layer 51 (an example of medium) is joined to the bottom surface of the lens layer 52, and in the print instruction step (S18), a print instruction for printing on the lens sheet 50 is performed to make the print engine 72 of the printer 40 print the image generated in the image generation step (S14). Therefore, it is possible to print the image 56 on the lens sheet 50, wherein the image 56 includes a three-dimensional image 58 capable of three-dimensionally being visualized (stereoscopically viewed, changed, etc.) with relatively high precision and a two-dimensional image 59 reduced in defects on print quality such as jaggy when observed through the lens layer 52.

(7) It is possible to perform printing of the image 56 in which the two-dimensional image and three-dimensional image decreased in defects such as jaggy, etc., are mixed by making the computer of at least one of the mobile terminal 20, the printer 40 and the server 30 execute the program PR.

(8) The printer 40 is equipped with a nonvolatile memory 79 that stores a program PR, and a computer 71 (especially, CPU 75) that executes the program PR, and a print engine 72 that prints the image data 57 generated by executing the program by the CPU 75 on the printing surface (surface of the ink absorbing layer 51) of the lens sheet 50. Therefore, the printer 40 performs the image generation processing in its inside to generate image data 57 capable of reducing defects of the two-dimensional image 59 such as jaggy while maintaining the resolution of the three-dimensional image 58 high when observed the image through the lens layer 52, and can print it as the image 56 on the lens sheet 50.

(9) The printer 40 is equipped with a compression processing section that compresses the two-dimensional image 59A in the direction that light focusing of a lens occurs, a magnification processing section that magnifies the two-dimensional image 59B after compression in the same direction as the compression direction, and a print engine 72 that prints the image 57 including the two-dimensional image 59 the three-dimensional image 58 after magnification at the magnification processing section on the lens sheet 50.

The aforementioned embodiment can be changed into the following embodiment.

The two-dimensional image data as an object to be compressed and magnified is not limited to image data of a displaying color system such as an RGB color system. The program PR can be a program that makes a computer execute a compression step that compresses image data after color converting into a CMYK color system and a magnification step that magnifies the two-dimensional image data of the CMYK color system after compression. Further, the program can be a program PR that makes a computer execute a compression step that compresses the image data of the CMYK color system obtained by subjecting the image data after color conversion to halftone processing and a magnification step that magnifies the two-dimensional image data of the CMYK color system after compression.

The method using compressing processing or magnification processing is not limited to each of the methods such as a bilinear method, etc., exemplified in the embodiment, and can be other known method. For example, a lanczos method can be used. Further, the method is not limited to a known method, and can be a method in which for example pixels are interpolated and compressed at a rate depending on the compression ratio in the compression direction, and magnifies by performing an interpolation that gives an average value of pixels of both sides in the magnification direction to the position of the interpolated pixel. In short, it is enough if the method can compress and magnify an image. Further, compression processing can be performed to the two-dimensional image plural times by different methods, and magnification processing can be performed to the two-dimensional image after compression plural times by different methods.

A function that allows a user to select at least one of a compression ratio and a magnification ratio by operating the mobile terminal 20 or a personal computer as a host device, or the printer 40 can be added to the program PR. For example, it is configured such that a user can select a compression ratio and the magnification ratio is automatically set by a computer to a value that the number of pixels of the two-dimensional image before compression in the lens intersection direction and the number of pixels of the two-dimensional image after magnification in the lens intersection direction become equal. In this case, it can be a method that the compression ratio is specified by a numeral, and it also can be a method that the strength of compression can be selected stepwise (for example, 2-10 steps). In this case, the program PR includes functions to execute a compression step that a computer compresses the two-dimensional image at the compression ratio given by the operation by the user in the lens intersection direction, and a magnification step that the computer then executes magnification processing of the two-dimensional image after compression at the magnification ratio selected so that the number of pixels in the lens intersection direction become equal before compression and after magnification. With this structure, the user can select an optimal magnification ratio, which can effectively reduce defects of print quality of the two-dimensional image such as jaggy, etc.

A function that allows a user to select interpolation used for at least one of compression processing and magnification processing by operating the mobile terminal 20 or the personal computer as a host device, or the printer 40 can be added to the program PR. For example, it is configured such that a user can select interpolation. In this case, the program PR includes functions to execute a compression step that the computer compresses the two-dimensional image in the lens intersection direction by the interpolation given by the operation of the user and a magnification step that the two-dimensional image after compression is subjected to the magnification processing by the same interpolation at the magnification ratio that the number of pixels in the lens interpolation direction becomes equal before compression and after magnification. With this structure, the user can select an optimal interpolation, which can effectively reduce defects on print quality of the two-dimensional image such as jaggy, etc.

The compression ratio and the magnification ratio can be set such that the number of pixels of the two-dimensional image before compression and the number of pixels of the two-dimensional image after magnification become different. In this case, the combination of the compression ratio and the magnification ratio can be set such that the number of pixels after magnification is reduced than the number of pixels before compression to reduce the two-dimensional image in the lens orthogonal direction LX, and such that the number of pixels after magnification is increased slightly in the lens orthogonal direction LX than the number of pixels before compression.

The two-dimensional image can also be subjected to compression and magnification in the lens longitudinal direction LY. That is, the two-dimensional image 59A can be compressed and magnified in both the lens longitudinal direction LY and the lens orthogonal direction LX. In cases where the lens 53 is replaced with a cylindrical lens, e.g., a toric lens having a curvature also in the longitudinal direction, by subjecting the two-dimensional image to compression and magnification in the lens orthogonal direction LX and the lens longitudinal direction LY in this order, the image quality can be improved also in the lens longitudinal direction LY. In this case, it is preferable that the compression ratio and the magnification ratio are determined based on the curvature in each direction of the lens and a magnification ratio is set so that the degree of compression and magnification in the lens longitudinal direction LY becomes smaller in the lens orthogonal direction LX.

Even in the case of a cylindrical lens, for example, for the purpose of removing image deterioration factors such as granularity of dots in the lens longitudinal direction LY, the two-dimensional image 59A can be subjected to compression and magnification in the lens longitudinal direction in this order. In this case, it is preferable to perform compression and magnification at a ratio smaller than the compression ratio and the magnification ratio in the lens orthogonal direction LX. With this structure, while improving the image quality of the two-dimensional image 59 in the lens longitudinal direction LY, jaggy of the two-dimensional image 59 can be controlled. Further, the directions of compression and magnification are not limited to the lens orthogonal direction LX, and can be the lens intersection direction intersecting with the lens longitudinal direction LY. Even if compression and magnification are performed in the lens intersection direction, since the compression and the magnification are performed in the component in the direction (lens orthogonal direction LX) that light focusing of a lens occurs, defects of the two-dimensional image such as jaggy, etc., can be reduced.

It is not bad to subject the three-dimensional image to compression processing or magnification processing. For example, for the purpose of reducing image quality deterioration factors of the three-dimensional image such as granularity of dots or banding (shaded stripe), compression processing and magnification processing can be performed in this order. Of course, other than the purpose of reducing image quality deterioration factors, compression and magnification can be performed in a predetermined direction for the purpose of adjusting the size.

The two-dimensional image can be subjected to other image processing in addition to the compression processing and the magnification processing. For example, shading processing can be performed. In this case, the direction of the shading processing can be set to the direction that light focusing of a lens occurs.

In place of the structure in which printing is performed to the lens sheet 50 having the ink absorbing layer 51 and the lens layer 52, it can be configured such that an image 57 is printed on the medium made of a film or a paper, and the medium after the print is pasted on a lenticular lens layer. Further, on the image printing surface of the medium, a lens layer can be formed by spraying a transparent resin liquid from a liquid ejection head by an ink-jet record method using a liquid fuel ejection equipment. As the transparent resin liquid, a photocurable resin that cures by light energy (e.g., ultraviolet curable resin) is used, a light (e.g., ultraviolet light) is irradiated onto the resin liquid in the form of a lens formed on the image printed on a medium to be cured to thereby form a lens layer. In short, if a three-dimensional image sheet is finally produced through a lens layer, the medium at the time of printing can include a lens layer or not.

The lens 53 is not limited to a cylindrical lens. It can be a toric lens.

The lens layer is not limited to a lenticular lens, and can be a fly-eye lens. Further, it can be a lens layer (lens array) in which, for example, hemispherical microconvex lenses are densely arranged on a plane. In this case, the two-dimensional image is subjected to compressing (compression step) and magnification processing (magnification step) in all directions (directions that light focusing occurs) in this order. In short, it is enough that the lens layer is capable of visualizing three-dimensionally. In the direction that light focusing of a lens constituting a lens layer occurs, it is sufficient to subject the two-dimensional image to compressing and magnification in this order.

The compression processing and the magnification processing can be performed not by software but by a hardware using, for example, a compressing processing circuit and a magnification processing circuit in the image processing circuit in ASIC. The printer 40 is provided with a compression processing section that compresses the two-dimensional image 59A in a direction that light focusing of a lens occurs, a magnification processing section that magnifies the two-dimensional image 59B after compression in the same direction as the compression direction, and a print engine 72 that prints the image 57 including the two-dimensional image 59 and the three-dimensional image 58 after magnification by the magnification processing section on the lens sheet 50. In this example, the compression processing section can be, for example, constituted by a compression processing circuit, and the magnification processing section can be, for example, constituted by a magnification processing circuit.

It is enough that the printer has a print function capable of printing on a medium. Further, the printer is not limited to a printer having a print function, and can be a multifunction machine having scanning and copying functions. Further, the print method in the printer can be an ink-jet type, a dot impact type, or a laser type. Further, the printer can be a serial printer, a line printer, or a page printer.

Technical ideas understood from the aforementioned embodiment and modifications thereof will be described as follows.

According to another embodiment, a program causes a computer to execute the compression step and the magnification step, and a compression ratio in the compressing step is a value within a range of 1/10-1/2. According to this structure, jaggy can be effectively reduced without deteriorating the image quality when a two-dimensional image is observed through a lens.

The printer in accordance with the embodiment is provided with a recording section that records the program and a computer that executes the program, and the computer is provided with a print section for printing the image generated by executing the program on a medium arranged so as to face the lens layer.

According to this structure, the image generated by executing the program by the computer of the printer is printed on a side of a medium opposite to the lens layer of the lens sheet. Therefore, when the image printed on the medium is observed through the lens layer, jaggy of the two-dimensional image can be controlled while maintaining the resolution of the three-dimensional image high.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image generation method for generating a composite image data to be printed on a medium arranged so as to face a lens layer having a plurality of lenses, the method comprising:
    obtaining an image data including two-dimensional image data and three-dimensional image data, the three-dimensional image data having a plurality of division compressing images which have been compressed and arranged so as to provide a three-dimensional visualization through the lens layer, the two-dimensional image data being located in a first area of the image data, the three-dimensional image data being located in a second area of the image data, which is different from the first area;
    taking out the two-dimensional image data from the first area of the image data after obtaining the image data;
    performing lossy compression for the two-dimensional image data in a direction in which light focusing of the lenses occurs after the taking out of the two-dimensional image data; and
    expanding the two-dimensional image data in the direction in which the light focusing of the lenses occurs after the lossy compression for the two-dimensional image data has been performed.

2. The image generation method according to claim 1, wherein
    the lens layer is constituted by a lenticular lens, and
    the direction in which the light focusing of the lenses occurs is a lens intersection direction intersecting with a longitudinal direction of the lenses.

3. The image generation method according to claim 2, wherein the lossy compression for the two-dimensional image data does not include compressing the two-dimensional image data in the longitudinal direction of the lenses.

4. The image generation method according to claim 3, wherein the number of pixels of the two-dimensional image data before the lossy compression for the two-dimensional image data in a direction parallel to a compression direction is equal to the number of the pixels of the two-dimensional image data after the expanding of the two-dimensional image data in a direction parallel to an expansion direction.

5. The image generation method according to claim 4, wherein the lossy compression for the two-dimensional image data uses one of methods selected from a bilinear method, a bicubic method, and a nearest-neighbor method, and the expanding of the two-dimensional image data uses one of methods selected from a bilinear method, a bicubic method, and a nearest-neighbor method.

6. The image generation method according to claim 5, wherein the medium constitutes a lens sheet in state in which the medium is secured to a bottom surface of the lens layer, and the image generation method further comprises causing a printing section of a printer to print a generated image by performing a print instruction to print on the lens sheet.

7. The image generation method according to claim 1, further comprising combining the two-dimensional image data with the three-dimensional image data such that the two-dimensional image data is fitted into the first area, after the performing of the lossy compression and the expanding of the two-dimensional image data to obtain the composite image data.

8. A printer configured to print an image based on image data on a medium arranged so as to face a lens layer having a plurality of lenses, the printer comprising:

a processor configured to obtain an image data including two-dimensional image data and three-dimensional image data, the three-dimensional image data having a plurality of division compressing images which have been compressed and arranged so as to provide a three-dimensional visualization through the lens layer, the two-dimensional image data being located in a first area of the image data, the three-dimensional image data being located in a second area of the image data, which is different from the first area;

a compression processing section configured to take out the two-dimensional image data from the first area of the image data, and perform lossy compression for the two-dimensional image data in a direction in which the light focusing of the lenses occurs after taking out the two-dimensional image data;

an expansion processing section configured to expand the two-dimensional image data, which has been compressed, in a direction equal to the direction in which the two-dimensional image data has been compressed; and a printing section configured to print the image after expanding the two-dimensional image data at the expansion processing section on the medium arranged so as to face the lens layer having the plurality of the lenses.

* * * * *